(12) United States Patent  
Demole (10) Patent No.: US 7,015,982 B2  
(45) Date of Patent: Mar. 21, 2006

(54) VIDEO PROJECTION SYSTEM

(76) Inventor: Frédéric Jean-Pierre Demole, 2 Old Brompton Road, London SW7 3DQ (GB) SW7 3DQ ( * ) Notice: Subject to any disclaimer, the term of this patent is extended or adjusted under 35 U.S.C. 154(b) by 507 days.

(21) Appl. No.: 10/257,865

(22) PCT Filed: Apr. 23, 2001

(86) PCT No.: PCT/GB01/01800

§ 371 (c)(1),  
(2), (4) Date: Oct. 17, 2002

(87) PCT Pub. No.: WO01/86966

PCT Pub. Date: Nov. 15, 2001

(65) Prior Publication Data

US 2003/0117594 A1   Jun. 26, 2003

(30) Foreign Application Priority Data

May 10, 2000 (GB) ................................. 0011208  
May 10, 2000 (GB) ................................. 0011210  
Jul. 4, 2000 (GB) ................................. 0016278

(51) Int. Cl.  
*H04N 9/14* (2006.01)  
*H04N 5/66* (2006.01)

(52) U.S. Cl. .................. 348/744; 348/750; 348/756; 348/757

(58) Field of Classification Search ............ 348/744, 348/781, 782, 783, 750, 745, 748, 756, 757, 348/758, 759, 760, 803, 804, 806, 779, 780; 359/204, 205, 618, 850, 859, 863, 864, 874, 359/876, 246; 353/30, 31

See application file for complete search history.

(56) References Cited

U.S. PATENT DOCUMENTS

| 5,485,225 | A | * | 1/1996 | Deter et al. ................. 348/804 |
| 5,663,832 | A | | 9/1997 | Miller et al. |
| 5,694,180 | A | * | 12/1997 | Deter et al. ................. 348/746 |
| 5,854,659 | A | * | 12/1998 | Deter et al. ................. 348/458 |
| 6,011,643 | A | * | 1/2000 | Wunderlich et al. ........ 359/279 |
| 6,057,964 | A | * | 5/2000 | Roeder et al. ............. 359/618 |
| 6,239,828 | B1 | * | 5/2001 | Ito et al. .................... 347/241 |

FOREIGN PATENT DOCUMENTS

| DE | 197 26 860 | | 1/1999 |
| GB | 2 253 280 | A | 2/1992 |
| HU | 9201452 | A | 9/1993 |
| WO | WO 95/03675 | A1 | 2/1995 |
| WO | WO 99/34247 | A1 | 7/1999 |

OTHER PUBLICATIONS

Patent Abstracts of Japan vol. 015, No. 435, Nov. 6, 1991 & JP 03 182714 A, Aug. 8, 1991.

* cited by examiner

*Primary Examiner*—John Miller  
*Assistant Examiner*—Jean W. Désir  
(74) *Attorney, Agent, or Firm*—Nixon & Vanderhye P.C.

(57) ABSTRACT

A video projection system (50) comprises a rotary disc (31) having light guiding devices (35) extending radially thereof and in a helical configuration circumferentially at the disc (31) and corresponding in number to the number of lines to be scanned on a screen (48) the arrangement being such that, as the disc (31) rotates, a light bundle is directed through successive devices (35) which cause the bundle to be scanned on the screen (48).

9 Claims, 8 Drawing Sheets

Fig 3

VIDEO PROJECTION SYSTEM

This application is the U.S. national phase of international application PCT/GB01/01800 filed 23 Apr. 2001 which designated the U.S.

This invention relates to a video projection system.

In WO 95/03675 there is disclosed a video projection system comprising means for generating a colour light bundle coloured according to a video signal and means for line scanning the bundle onto a screen thereby producing images on the screen.

The system includes a disc which is adapted to rotate on an axis extending through a centre of the disc and at right angles to the plane of the disc, the disc having a series of plane mirror facets extending circumferentially of the disc on a circumferential surface thereof, and a plane mirror adapted to pivot relative to an axis extending through the plane of the mirror and parallel to a diameter of the disc for receiving the bundle of light reflected from successive mirror facets during rotation of the disc.

A problem with such a known video projection system is that the functions required of the pivotable plane mirror are very demanding and are not achievable with today's technology and are unlikely to be achieved in the near future.

The present invention is characterised in that a video projection system includes a disc carrying a plurality of light guiding devices extending radially of the disc and spaced one from another in an angular direction in the plane of the disc and each device extending at an angle to the plane of the disc in a corresponding plane perpendicular to the plane of the disc so that each device projects a corresponding one of the lines scanning a video image on to the screen.

In the video projection system in accordance with the present invention there is no requirement for a pivotable plane mirror.

Following is a description, by way of example only and with reference to the accompanying drawings, of one method of carrying the invention into effect.

Figure 1:
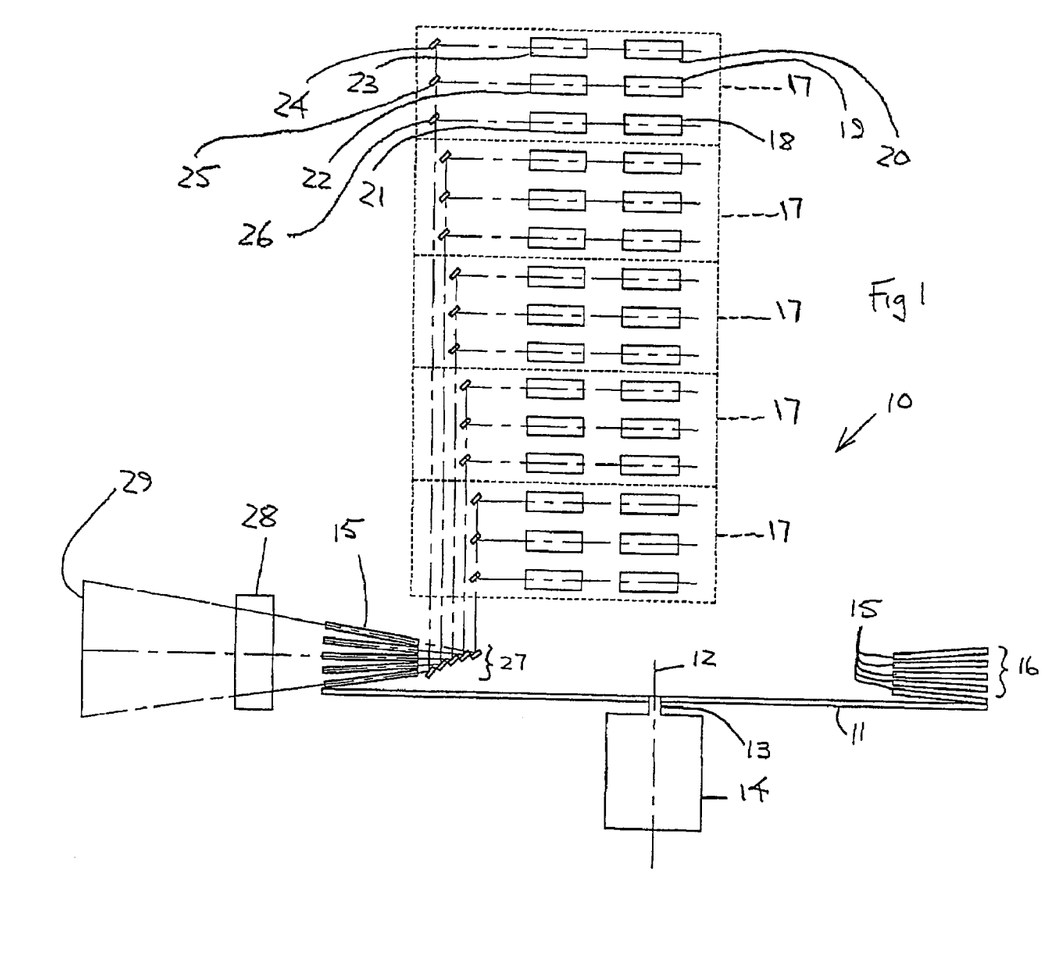
FIG. 1 is a diagrammatic elevation demonstrating the concept of a video projection system in accordance with the present invention.
Figure 2:
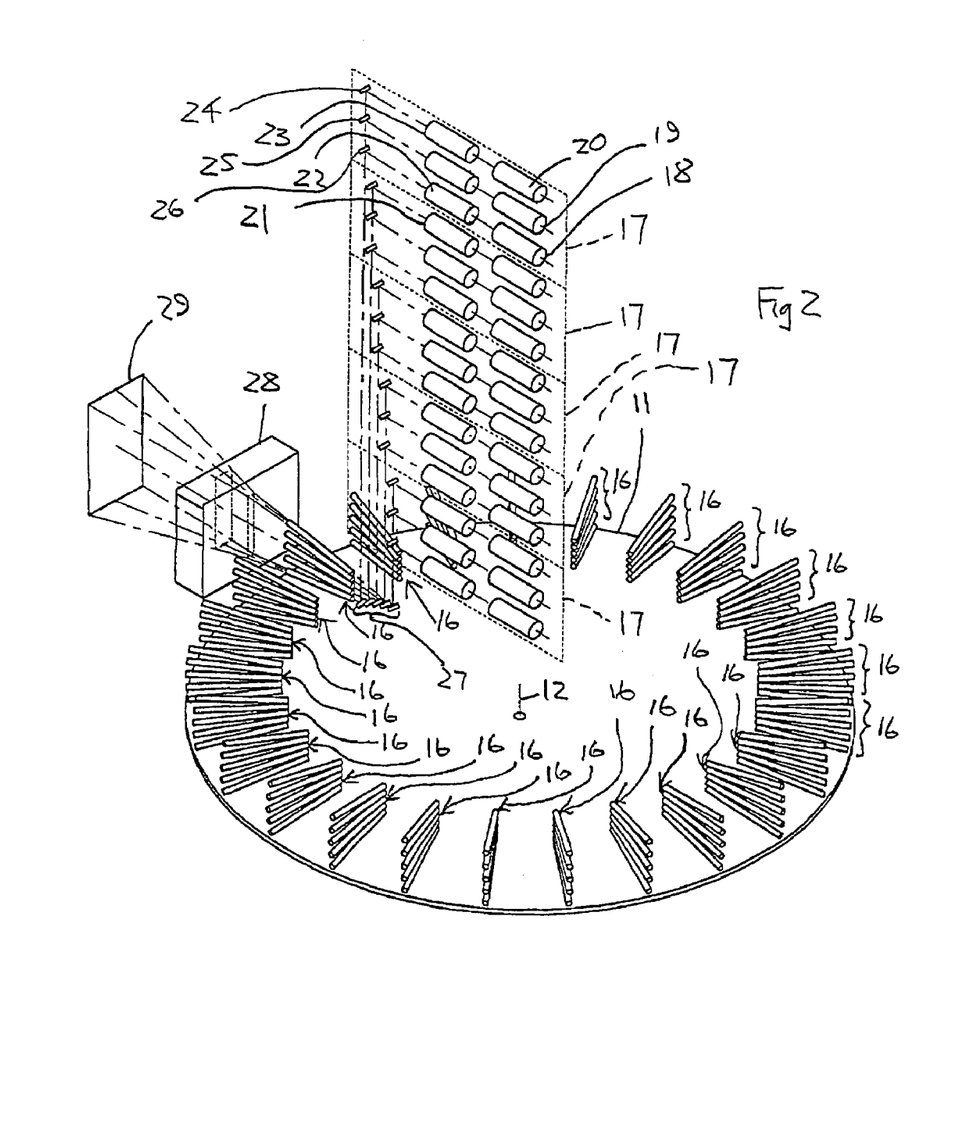
FIG. 2 is a diagrammatic perspective view of the arrangement shown in FIG. 1.

Referring now to FIGS. 1 and 2 of the drawings, which are diagrammatic conceptual representations, a video projection system 10 in accordance with the present invention comprises a disc 11 which is adapted to rotate on an axis 12 extending through a centre of the disc 11 and at right angles of the plane of the disc. In this regard, the disc 11 is secured on a shaft 13 of a motor 14, the central longitudinal axis of the shaft 13 being coaxial with the axis 12. The disc 11 has mounted thereon a plurality of light guiding devices 15 extending radially of the disc 11 in a margin extending circumferentially of the disc 11. The devices 15 are arranged in groups 16 and the devices 15 in each group 16 are stacked one above another in respective radial planes of the disc 11 and extend at specified angles relative to the plane of the disc 11 in the respective planes. The planes containing the groups 16 are angular spaced equidistant one from another throughout a 360 degrees sweep of the plane of the disc 11.

The system 10 includes a plurality of component groups 17 each comprising three laser light sources 18, 19 and 20 for providing respectively the colours red, green and blue of a video signal, corresponding modulators 21, 22 and 23 for modulating the intensity of the light bundles which issue from the light sources 18 to 20, a plane mirror 24 and two plane dichroic mirrors 25 and 26 for combining into a single light bundle, the modulated light bundles and a mirror 27 for reflecting the combined light bundles. The array of mirrors 27 corresponding to the respective component groups 17 are stacked at a location relative to the disc 11 spaced inwardly of the margin of the disc 11 containing the groups 16 of light guiding devices.

The system 10 also includes an optical system, shown generally at 28, for enlarging the horizontal projection angle, the optical system 28 being located opposite the array of mirrors 27 and adjacent the periphery of the disc 11, and a screen 29.

The system 10 may be adapted for scanning 625 lines on the screen 28 for each $\frac{1}{25}$ of a second, where 25 is the number of images per second contained in the video signal. In order to achieve this, 125 groups 16 each comprising 5 light guiding devices 15 are located on the disc 11 (although only 25 groups 16 are shown in FIG. 2 for clarity), each group 16 being positioned at an angle of 2.88 degrees in the plane of the disc 11 from an adjacent group 16 and the angular positioning of the devices 15 in their respective radial planes relative to the plane of the disc 11 is calculated so as to project light at an angle relative to the plane of the disc 11 according to the formula:

$$+9 - (N-1) \times \frac{18}{624} \text{ degrees.}$$

where N is the number positioning of a light guiding device 15 in the range 1 to 625 starting from an uppermost guide 15.

The light guiding devices 15 each of which may be a light rod, a waveguide, a cavity, a lens or any combination thereof, in effect, provide a helical formation of 625 devices 15 during 5 consecutive revolutions of the disc 11. The speed of the motor 14 is 125 revolutions per second.

Since there are 5 light guiding devices 15 in each group 16, there are 5 component groups 17, each associated with a corresponding one of the 5 devices 15 of each group 16. The component groups 17 control operation of the light guiding devices 15 as each of the devices 15 moves between the mirrors 27 and the optical system 28, signals switching from one group 17 to another after each revolution of the disc 11 until five revolutions of the disc 11 have been completed, when the sequence is repeated.

It will be appreciated that instead of there being 5 component groups 17, only one component group 17 may be provided which would direct the combined light bundle to the appropriate layer of light guiding devices 15.

Figure 3:
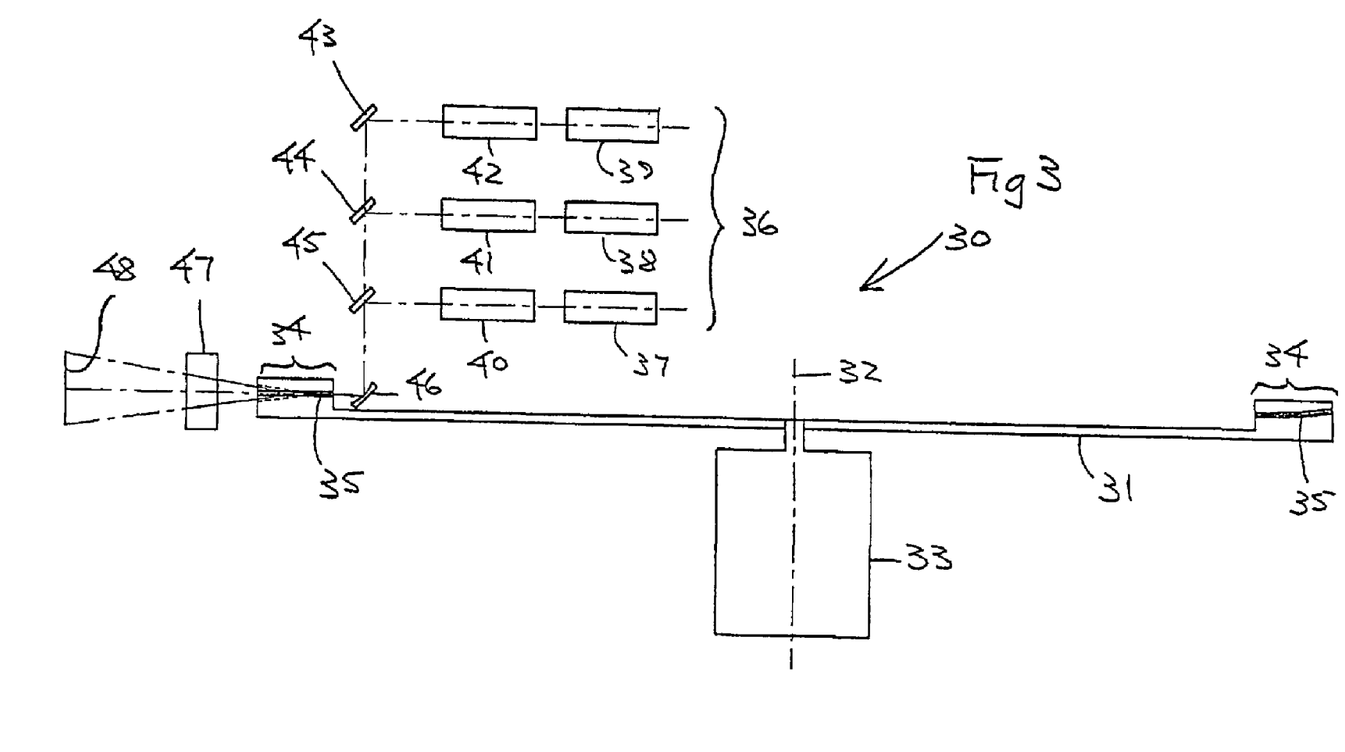
FIG. 3 is a diagrammatic elevation of a preferred embodiment of a video projection system in accordance with the present invention.
Figure 4:
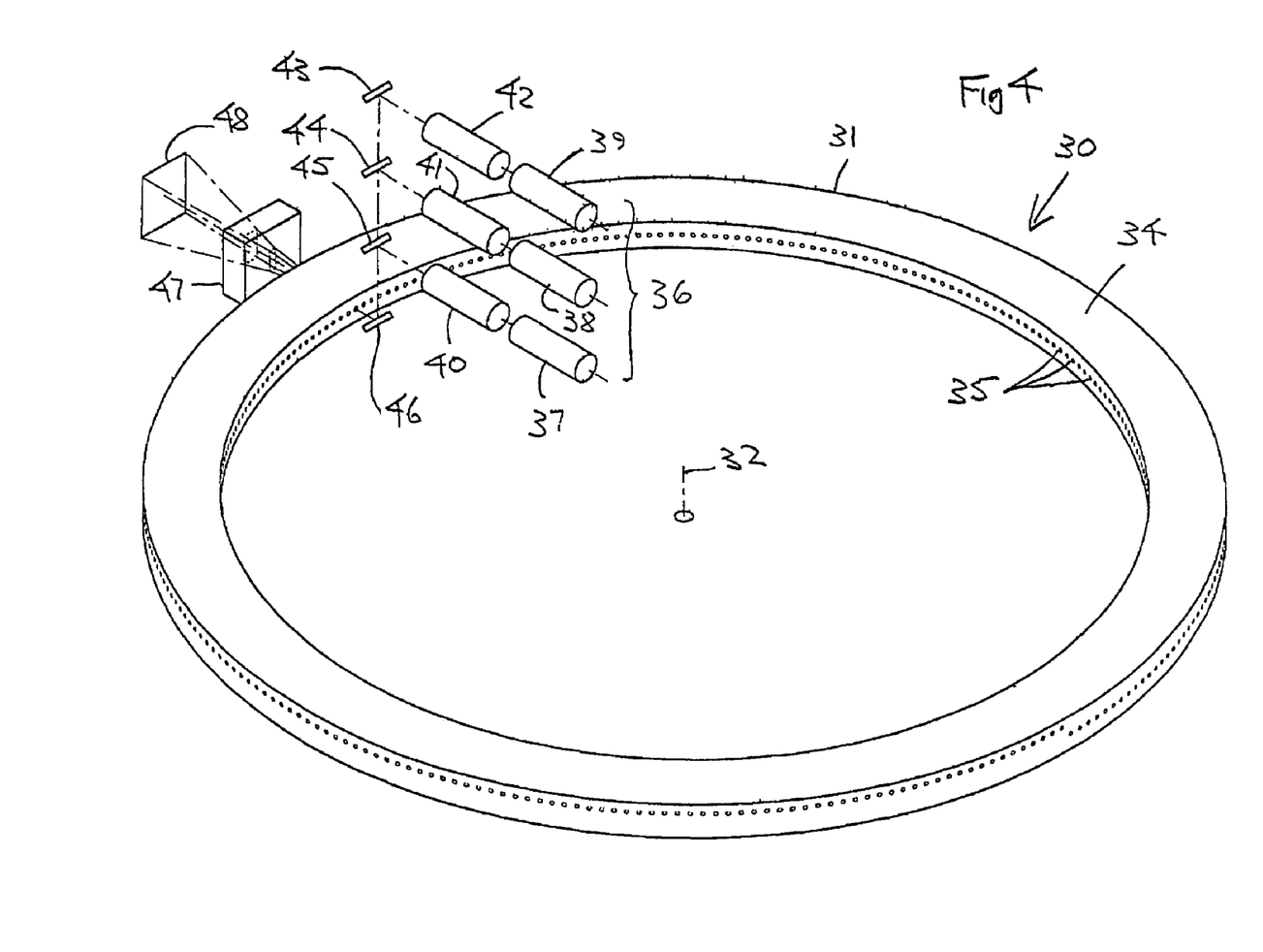
FIG. 4 is a diagrammatic perspective view of the embodiment shown in FIG. 3.

Referring now to FIGS. 3 and 4 of the drawings, there is shown a preferred embodiment of a video projection system 30 comprising a disc 31 which is rotatable, on an axis 32 extending through a centre thereof, by means of a motor 33. The disc 31 is provided with a circumferential margin 34 of increased cross sectional dimension and the margin 34 is provided with 625 light guiding devices 35 in the form of cavities enveloped in a laser reflecting material, each being curved in a plane perpendicular to the plane of the disc so as to project light at an angle in accordance with the formula stated above, each extending radially of the disc 31 and each extending at an angle of 0.576 degrees one to another in the plane of the disc 31. The angular relationship of the light guiding devices 35 one to another in their respective planes perpendicular to the plane of the disc 31 is such that the sweep of the devices 35 through 360 degrees of the circumference of the disc 31 is helical in configuration.

The system 30 includes a component group 36 comprising three laser light sources 37, 38 and 39 for providing respectively the colours red, green and blue of a colour video signal, corresponding modulators 40, 41 and 42 for modulating the intensity of the light bundles which issue from the light sources 37 to 39, a plane mirror 43 and plane dichroic mirrors 44 and 45 for combining into a single light bundle, the modulated light bundles and a mirror 46 for reflecting the combined light bundles.

The system 30 also includes an optical system, shown generally at 47, for enlarging the horizontal projection angle the optical system 30 being located opposite the mirror 46 and adjacent the periphery of the disc 31, and a screen 48.

In operation, the motor 33 is arranged to rotate the disc 31 at 25 revolutions per second and the component group 36 operates so that a bundle of light reflected by the mirror 46 is directed through the light guiding devices 35 as they pass successively between the mirror 46 and the optical system 47. The spiral configuration of the light guiding devices 35 ensures that screen 48 is scanned by 625 lines per revolution of the disc 31 and the speed of the rotating disc 31 ensures that the images received on the screen 48 match the number of images per second contained in the video signal.

Figure 5:
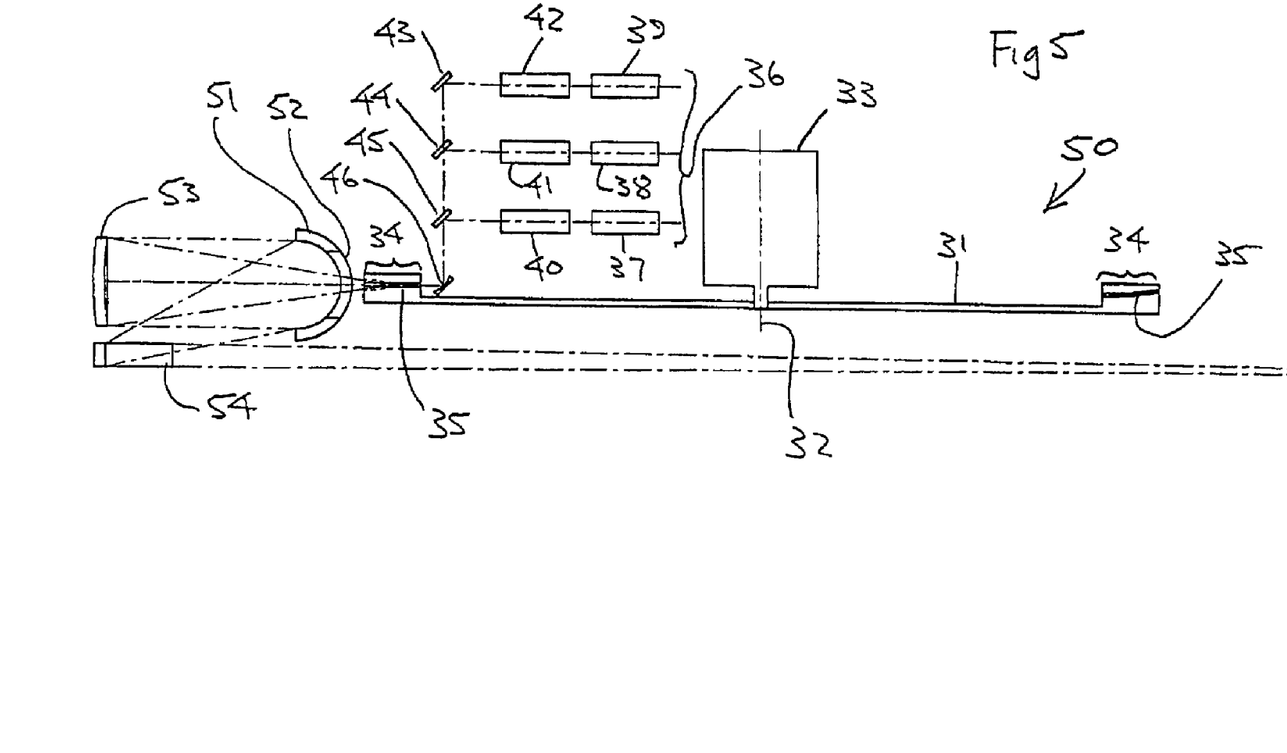
FIG. 5 is a diagrammatic elevation of another embodiment of a video projection system in accordance with the present invention.
Figure 6:
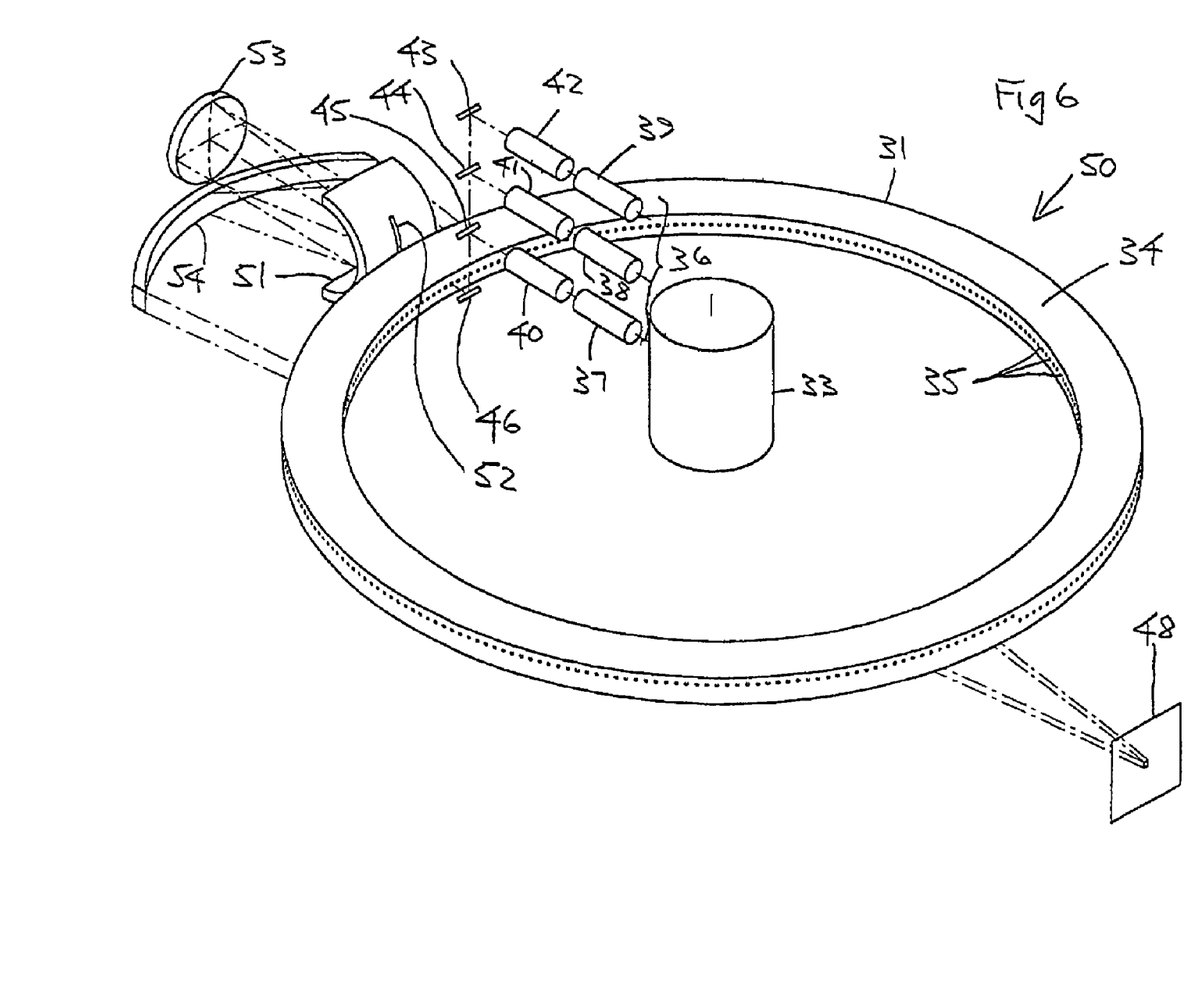
FIG. 6 is a diagrammatic perspective view of the embodiment shown in FIG. 5.

Referring now to FIGS. 5 and 6 of the drawings, there is shown an embodiment of a video projection system 50 which is similar to the system 30 shown in FIGS. 3 and 4 and same reference numerals are incorporated in FIGS. 5 and 6 for the same components which are shown in FIGS. 3 and 4.

In the system 50, the motor 33 is located above the disc 31 and the components of one possible embodiment of the optical system 47 are shown in detail. More particularly, the optical system 47 comprises a toroidal mirror 51, this facing away from the disc 31 and having a slot 52, a concave spherical mirror 53 facing the toroidal mirror 51 and a concave cylindrical mirror 54 facing the toroidal mirror 51.

The arrangement is such that, in operation and while disc 31 rotates, a light bundle directed through the light guiding devices 35 passes successively through the slot 52 to the concave mirror 53 where it is reflected back onto the toroidal mirror 51. At the toroidal mirror 51 the light bundle is reflected onto the concave cylindrical mirror 54 where it is again reflected and passes under the disc 31 and is received at the screen 48 as a spot substantially 2.5 mm in diameter.

As each light guiding device 35 moves 0.576 degrees in front of the mirror 46, the light projected by each light guiding device 35 moves from left to right of the screen 48 along the line of the video image corresponding to the particular light guiding device.

In an alternative arrangement, the toroidal mirror 51 may be located between the mirror 46 and the margin 34 of the disc 31.

Figure 7:
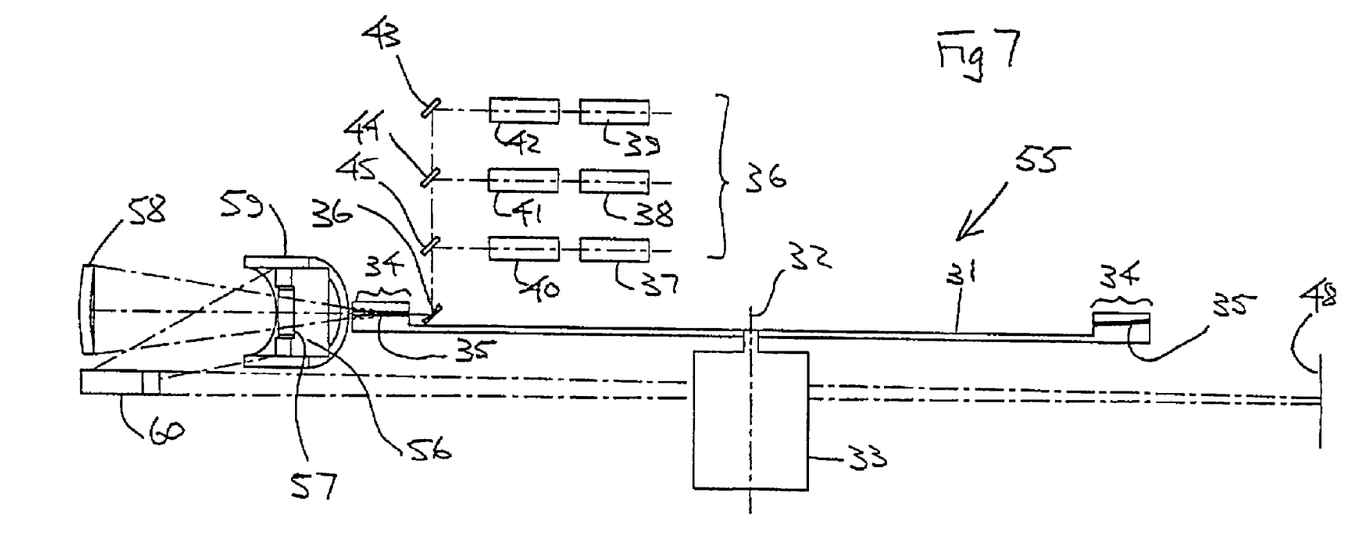
FIG. 7 is a diagrammatic elevation of another embodiment of a video projection system in accordance with the present invention.
Figure 8:
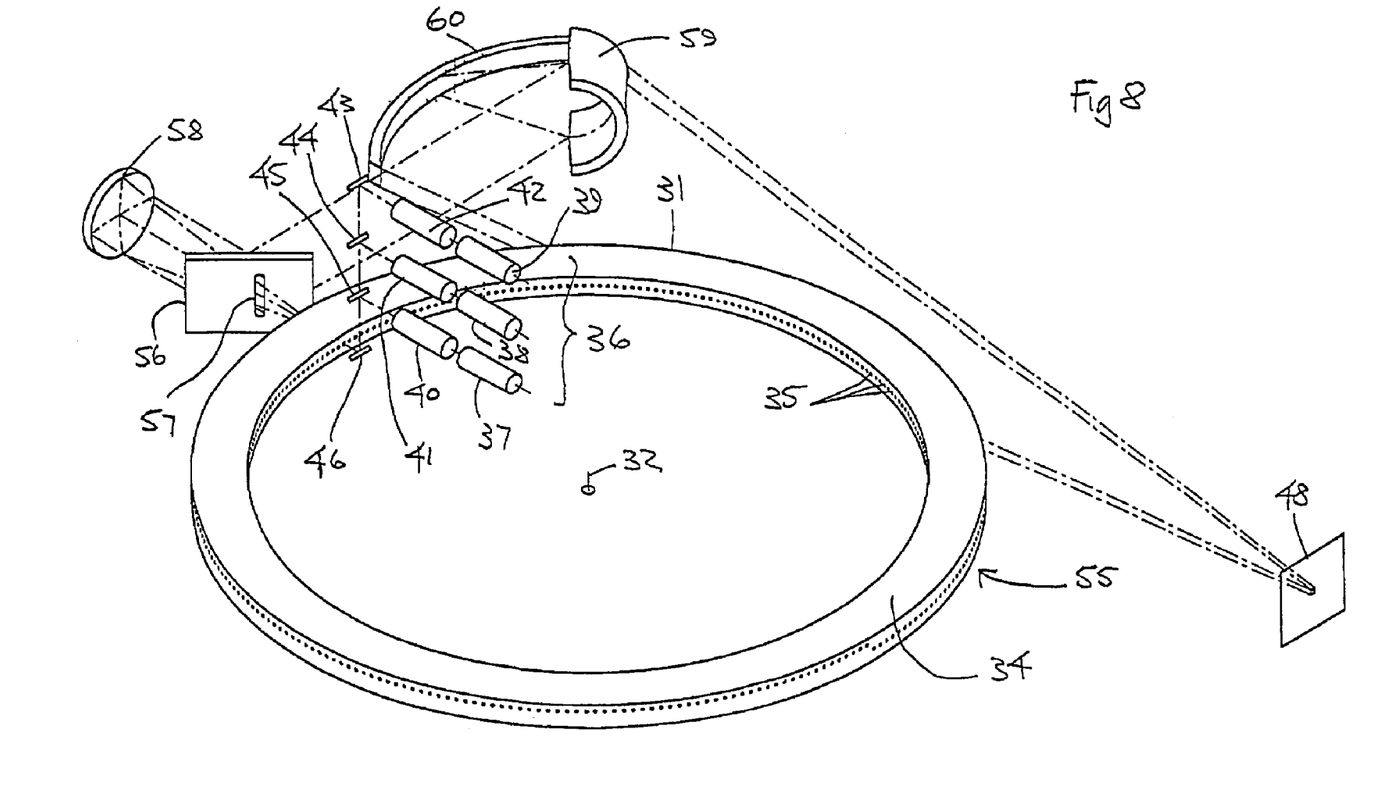
FIG. 8 is a diagrammatic perspective view of the embodiment shown in FIG. 7.

Referring now to FIGS. 7 and 8 of the drawings, there is shown an embodiment of a video projection system 55 which is similar to the system 30 shown in FIGS. 3 and 4 and the same reference numerals are incorporated in FIGS. 7 and 8 for the same components which are shown in FIGS. 3 and 4.

In the system 55 the components of another possible embodiment of the optical system 47 are shown in more detail. More particularly, the optical system comprises a plane mirror 56, this facing away from the disc 31 and having a slot 57, a concave spherical mirror 58 facing the plane mirror 56 and the reflective surface of the plane mirror 56 being at an angle of 45 degrees to the focal plane of the concave spherical mirror 58, a toroidal mirror 59 being at an angle of 45 degrees to reflective light from the plane mirror 56 and a concave cylindrical mirror 60 facing the toroidal mirror 59.

The arrangement is such that, in operation, and while disc 31 rotates, a light bundle directed through the light guiding devices 35 passes successively through the slot 57 to the concave mirror 58, where it is reflected back onto the plane mirror 56. At the plane mirror 56 the light bundle is reflected onto the toroidal mirror 59 where it is reflected on to the concave cylindrical mirror 60 where it is again reflected and passes under the disc 31 and is received at the screen 48 as a spot substantially 2.5 mm in diameter.

It will be appreciated that a video projection system in accordance with the present invention may be adjusted to scan a different number of lines per image than 625. For example, if the number of lines to be scanned is 525, the disc will be provided with a corresponding number of light guiding devices.

It will also be appreciated that, instead of providing modulators for modulating the intensity of light issuing from the light sources, the light sources may be modulated by directly modulating the electrical input currents to the light sources.

Furthermore, it will be appreciated that the term "mirror" may include a block of laser reflective material, such as magnesium oxide.

What is claimed is:

1. A video projection system (30) comprising means (36, 46) for generating a coloured light bundle coloured according to a video signal and means (31, 35) for line scanning the bundle onto a screen (48) thereby producing images on the screen (48), the system (30) also including a disc (31) adapted to rotate on an axis (32) extending through a centre of the disc (31) and at right angles to a plane of the disc (31), the system (30) also including means for enlarging a horizontal projection angle, characterised in that the disc (31) carries a plurality of light guiding devices (35) extending radially of the disc (31) and spaced one from another in an angular direction in the plane of the disc (31) and each device (35) extending at an angle to the plane of the disc (31) in a corresponding plane perpendicular to the plane of the disc (31) so that each device (35) projects a corresponding one of the lines scanning a video image onto the screen (48) and characterised in that the means for enlarging the horizontal projection angle includes a combination of mirrors for receiving a light bundle from a light guiding device (35) and for reflecting the light bundle onto the screen (48), said combination of mirrors including a toroidal mirror.

2. A video projection system (50) as claimed in claim 1 characterised in that the combination of mirrors (51,53,54) includes a concave spherical mirror (53) for reflecting the light bundle from a light guiding device (35), the toroidal mirror (51) for reflecting the light bundle from the concave spherical mirror (53) and a concave cylindrical mirror (54) for reflecting the light bundle from the toroidal mirror (51) to the screen (48).

3. A video projection system (50) as claimed in claim 2 characterised in that the toroidal mirror (51) is provided with a slot (52) which is arranged so that the light bundle incident on the concave spherical mirror (53) passes through the slot (52).

4. A video projection system (55) as claimed in claim 1 characterised in that the combination of mirrors (56,58,59, 60) includes a concave spherical mirror (58) for reflecting the light bundle from a light guiding device (35), a plane mirror (56) for reflecting the light bundle from the concave spherical mirror (58), the toroidal minor (59) for reflecting the light bundle from the plane mirror (56) and a concave cylindrical mirror (60) for reflecting the Light bundle from the toroidal mirror (59) to the screen (48).

5. A video projection system (55) as claimed in claim 4 characterised in that the plane mirror (56) is provided with a slot (57) which is arranged so that the light bundle incident on the concave spherical mirror (53) passes through the slot (57).

6. A video projection system as claimed in claim 2 characterised in that the toroidal mirror is located between the light guiding devices (35) and the axis of rotation (32) of the disc (31).

7. A video projection system as claimed in claim 1 characterised in that the devices (35) are arranged in a single helical configuration.

8. A video projection system as claimed in claim 1 characterised in that the means (36, 46) for generating a coloured light bundle coloured according to a video signal includes a number of dichroic mirrors (44, 45) to combine a number of modulated light bundles in order to create the coloured light bundle.

9. A video projection system as claimed in claim 3 characterised in that the toroidal mirror is located between the light guiding devices (35) and the axis of rotation (32) of the disc (31).

* * * * *